US009878591B2

(12) United States Patent
Taniguchi et al.

(10) Patent No.: US 9,878,591 B2
(45) Date of Patent: Jan. 30, 2018

(54) ONBOARD AIR CONDITIONING DEVICE, AIR CONDITIONING UNIT, AND VEHICLE

(71) Applicant: PANASONIC CORPORATION, Osaka (JP)

(72) Inventors: Katsuji Taniguchi, Kanagawa (JP); Yoshitoshi Noda, Kanagawa (JP); Tomohiro Terada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 483 days.

(21) Appl. No.: 14/387,385

(22) PCT Filed: Mar. 25, 2013

(86) PCT No.: PCT/JP2013/002022
§ 371 (c)(1),
(2) Date: Sep. 23, 2014

(87) PCT Pub. No.: WO2013/145701
PCT Pub. Date: Oct. 3, 2013

(65) Prior Publication Data
US 2015/0041553 A1 Feb. 12, 2015

(30) Foreign Application Priority Data

Mar. 26, 2012 (JP) .................................. 2012-068963

(51) Int. Cl.
*B60H 1/00* (2006.01)
*B60H 1/02* (2006.01)
(Continued)

(52) U.S. Cl.
CPC ..... *B60H 1/00278* (2013.01); *B60H 1/00035* (2013.01); *B60H 1/00335* (2013.01);
(Continued)

(58) Field of Classification Search
CPC ............ B60H 1/00278; B60H 1/00035; B60H 1/00335
(Continued)

(56) References Cited

U.S. PATENT DOCUMENTS

| 4,412,425 A | * | 11/1983 | Fukami | .............. | B60H 1/00007 |
| | | | | | 454/161 |
| 4,494,597 A | * | 1/1985 | Fukami | .............. | B60H 1/00007 |
| | | | | | 165/41 |

(Continued)

FOREIGN PATENT DOCUMENTS

| FR | 2949096 A3 | 2/2011 |
| JP | 05-147423 A | 6/1993 |

(Continued)

OTHER PUBLICATIONS

Extended Search Report for Application No. 13769197.8-1756/2832563 dated Jun. 29, 2015.
(Continued)

*Primary Examiner* — Avinash Savani
*Assistant Examiner* — Deepak Deean
(74) *Attorney, Agent, or Firm* — Pearne & Gordon LLP

(57) ABSTRACT

An onboard air conditioning device wherein the heating capability of air conditioning is improved, and gas is prevented from flowing into the vehicle interior even in the unlikely event that gas is produced by a battery. In this device, one end of an air flow channel is connected to an air conditioning unit for blowing temperature-regulated air into a vehicle interior, and the other end opens into the vehicle interior. The air flow channel draws air into the vehicle interior from the opening, the intake air is passed through a battery and heated by heat exchange, and the air is then sent to the air conditioning unit. The air conditioning unit sends the air from the air flow channel to a sensible heat
(Continued)

exchanger, and after this air undergoes heat exchange with air taken in from another channel, the air is exhausted out of the vehicle interior.

6 Claims, 3 Drawing Sheets

(51) Int. Cl.
*B60L 1/00* (2006.01)
*B60L 3/00* (2006.01)
*B60L 11/18* (2006.01)

(52) U.S. Cl.
CPC ............... *B60H 1/02* (2013.01); *B60L 1/003* (2013.01); *B60L 3/0046* (2013.01); *B60L 11/1874* (2013.01); *B60L 11/1877* (2013.01); *B60H 2001/003* (2013.01); *B60H 2001/00085* (2013.01); *B60H 2001/00178* (2013.01); *B60L 2240/34* (2013.01); *Y02T 10/7005* (2013.01); *Y02T 10/705* (2013.01)

(58) Field of Classification Search
USPC ...................................................... 237/12.3 A
See application file for complete search history.

(56) References Cited

U.S. PATENT DOCUMENTS

| | | | | |
|---|---|---|---|---|
| 5,309,731 | A * | 5/1994 | Nonoyama | B60H 1/00849 62/244 |
| 5,647,534 | A * | 7/1997 | Kelz | B60H 1/00392 165/43 |
| 7,413,007 | B2 * | 8/2008 | Yamaoka | B60H 1/03 137/512.15 |
| 7,988,543 | B2 * | 8/2011 | Major | B60H 1/00278 454/107 |
| 8,029,343 | B2 * | 10/2011 | Major | B60H 1/00278 454/70 |
| 2005/0230096 | A1 | 10/2005 | Yamaoka | |
| 2009/0071178 | A1 * | 3/2009 | Major | B60H 1/00278 62/239 |
| 2011/0165830 | A1 | 7/2011 | Smith | |
| 2012/0003510 | A1 * | 1/2012 | Eisenhour | H01M 10/625 429/50 |
| 2012/0003910 | A1 * | 1/2012 | Richter | B60H 1/00278 454/141 |
| 2014/0196866 | A1 * | 7/2014 | Bezzina | B60H 1/00278 165/42 |

FOREIGN PATENT DOCUMENTS

| | | |
|---|---|---|
| JP | 05-178070 A | 7/1993 |
| JP | 08-108735 A | 4/1996 |
| JP | 2006-151270 A | 6/2006 |
| JP | 2009-023482 A | 2/2009 |
| JP | 2010-036723 A | 2/2010 |
| JP | 2012-001037 A | 1/2012 |

OTHER PUBLICATIONS

International Search Report for Application No. PCT/JP2013/002022 dated Jun. 11, 2013.

* cited by examiner

ONBOARD AIR CONDITIONING DEVICE, AIR CONDITIONING UNIT, AND VEHICLE

TECHNICAL FIELD

The present invention relates to an in-vehicle air conditioning apparatus mounted in, for example, a vehicle such as an electric automobile, an air conditioning unit, and a vehicle.

BACKGROUND ART

Conventionally, there has been known an in-vehicle air conditioning apparatus that improves heating capability of an air conditioning unit by taking in air heated by heat exchange with a battery into the air conditioning unit (see, Patent Literature ((hereinafter, abbreviated as PTL) 1, for example).

Specifically, the in-vehicle air conditioning apparatus of PTL 1 is provided with an airflow passage for allowing the air to flow to the battery. One end of the airflow passage is opened at the rear of a vehicle interior, and the other end thereof is connected to the air conditioning unit at the front of the vehicle interior. Therefore, when the air sent out from the air conditioning unit flows through the rear of the vehicle interior is drawn from the one end of the airflow passage, and passes by the battery. At this time, the air is heated by heat exchange with the battery. Thereafter, the heated air is returned to the air conditioning unit, and is sent out to the vehicle interior again after temperature control.

CITATION LIST

Patent Literature

PTL 1
Japanese Patent Application Laid-Open No. HEI 05-178070

SUMMARY OF INVENTION

Technical Problem

However, since PTL 1 adopts a configuration in which the air subjected to heat exchange with the battery is introduced into the vehicle interior without any processing, there arises a problem in that, when a gas is generated by a problem with the battery, the gas is also introduced into the vehicle interior. Note that, as an example of the battery that generates a gas when having a problem, a lithium ion secondary battery is known.

An object of the present invention is to provide an in-vehicle air conditioning apparatus, air conditioning unit, and a vehicle each capable of preventing a gas from flowing into the vehicle interior, even if a gas is generated due to a problem with the battery by any chance, while improving the heating capability of air conditioning.

Solution to Problem

An in-vehicle air conditioning apparatus according to an aspect of the present invention includes: an air conditioning unit that sends temperature-controlled air into a vehicle interior; and an airflow passage that is connected to the air conditioning unit at one end, that has an opening into the vehicle interior at another end, and that is used for sending air taken in from the vehicle interior into the air conditioning unit after the air is heated by exhaust heat of a battery, in which the air conditioning unit includes a sensible heat exchanger that discharges the air sent from the airflow passage to the outside of the vehicle interior after subjecting the air to heat exchange with air taken in from a different channel.

An air conditioning unit according to an aspect of the present invention is an air conditioning unit that sends temperature-controlled air into a vehicle interior, the air conditioning unit including: a sensible heat exchanger that performs heat exchange between air taken in from a vehicle interior and heated by exhaust heat of a battery, and at least one of outside air introduced from the outside of the vehicle interior and inside air introduced from the inside of the vehicle interior; and an exhaust passage that discharges the air heated by exhaust heat of the battery and subjected to heat exchange in the sensible heat exchanger to the outside of the vehicle interior.

A vehicle according to an aspect of the present invention includes the in-vehicle air conditioning apparatus according to an aspect of the present invention.

Advantageous Effects of Invention

Even if a gas is generated due to a problem with a battery by any chance, discharging the air heated by heat exchange with the battery to the outside of the vehicle interior after passing through a sensible heat exchanger makes it possible to prevent the gas from flowing into the vehicle interior, while improving the heating capability of the air conditioning.

DESCRIPTION OF EMBODIMENT

An embodiment of the present invention will be described in detail below with reference to the accompanying drawings.

First, an overall configuration of the in-vehicle air conditioning apparatus according to an embodiment of the present invention will be described.

Figure 1:
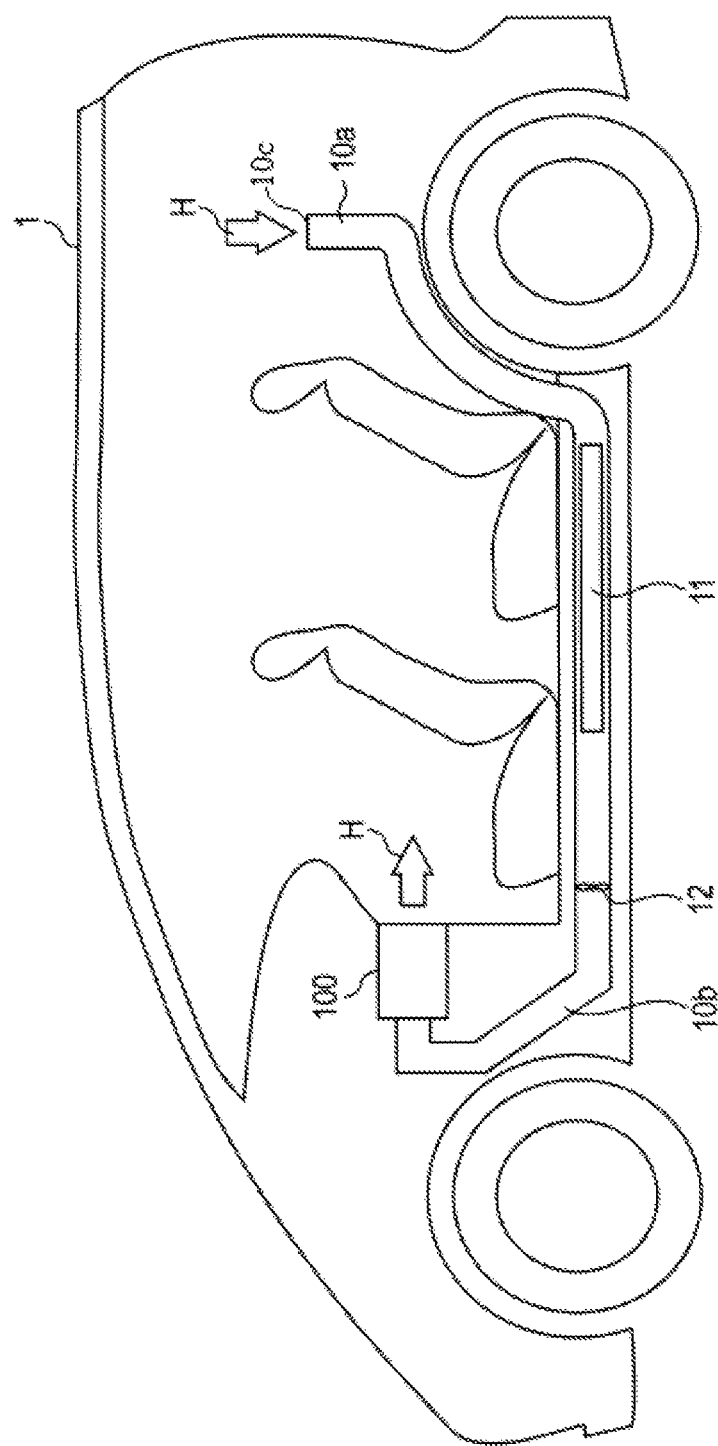
FIG. 1 is a diagram illustrating a configuration of an in-vehicle air conditioning apparatus according to an embodiment of the present invention.

FIG. 1 is a diagram illustrating the configuration of the in-vehicle air conditioning apparatus according to the present embodiment. The in-vehicle air conditioning apparatus is provided with air conditioning unit 100 and airflow passage 10, and is mounted in, for example, vehicle 1 such as an electric automobile. In FIG. 1, airflow passage 10 is denoted and illustrated by reference numerals by being divided into upstream side 10*a* and downstream side 10*b*.

Air conditioning unit 100 is disposed at the front of vehicle 1, and sends temperature-controlled air into the vehicle interior. Air H is air that is sent out to the vehicle interior from air conditioning unit 100.

Furthermore, an end of downstream side 10*b* of airflow passage 10 is connected to air conditioning unit 100. Thus, air conditioning unit 100 takes in the air that has passed through airflow passage 10.

In addition, the detailed configuration of air conditioning unit 100 will be described below with reference to FIG. 2.

Airflow passage 10 is a passage for sending the air taken in from the vehicle interior into air conditioning unit 100. As illustrated in FIG. 1, airflow passage 10 passes through the lower side of the seat from the rear of the vehicle interior and communicates with the front of the vehicle interior. Moreover, in airflow passage 10, the end of downstream side 10b is connected to air conditioning unit 100, and meanwhile, the end of upstream side 10a is opened 10c at the rear of the vehicle interior. Air H of the vehicle interior is taken in from the opening 10c.

Furthermore, battery 11 serving as a drive source of vehicle 1 is disposed inside airflow passage 10. A lithium ion secondary battery can be cited as an example of battery 11.

Furthermore, fan 12 that performs a blowing operation to send air H taken in from the vehicle interior into air conditioning unit 100 is disposed on downstream side 10b of airflow passage 10.

In the in-vehicle air conditioning apparatus configured as described above, the flow of air H is as follows. First, air conditioning unit 100 sends out temperature-controlled air H into the vehicle interior. When flowing through the vehicle interior to reach the rear of the vehicle interior, air H is taken in from the opening of downstream side 10b of airflow passage 10. Thereafter, air H flows toward downstream side 10b from upstream side 10a and passes by battery 11. At this time, air H is heated by heat exchange with battery 11. Heated air H is sent to air conditioning unit 100 by the blowing operation of fan 12. Air conditioning unit 100 performs the temperature control using the heat of air H sent from airflow passage 10, and sends out air H into the vehicle interior again.

In addition, in the example of FIG. 1, the end of upstream side 10a of airflow passage 10 is opened at the rear of the vehicle interior, but this position is not limited to the rear of the vehicle interior. Furthermore, in the example of FIG. 1, fan 12 is disposed on downstream side 10b of airflow passage 10, but this position is not limited to downstream side 10b. For example, fan 12 may be provided in the vicinity of the opening of upstream side 10a. As a result, air H in the vehicle interior is easily taken into airflow passage 10. Furthermore, a plurality of fans 12 may be provided in airflow passage 10. For example, fan 12 is provided on each of upstream side 10a and downstream side 10b. Thus, it is possible to smoothly move the taken air H within airflow passage 10.

In this way, the in-vehicle air conditioning apparatus according to the present embodiment can achieve an improvement in heating capability using the exhaust heat of the battery.

The overall configuration of the in-vehicle air conditioning apparatus according to the present embodiment has been described thus far.

Next, the air conditioning unit provided in the in-vehicle air conditioning apparatus according to the present embodiment will be described.

Figure 2:
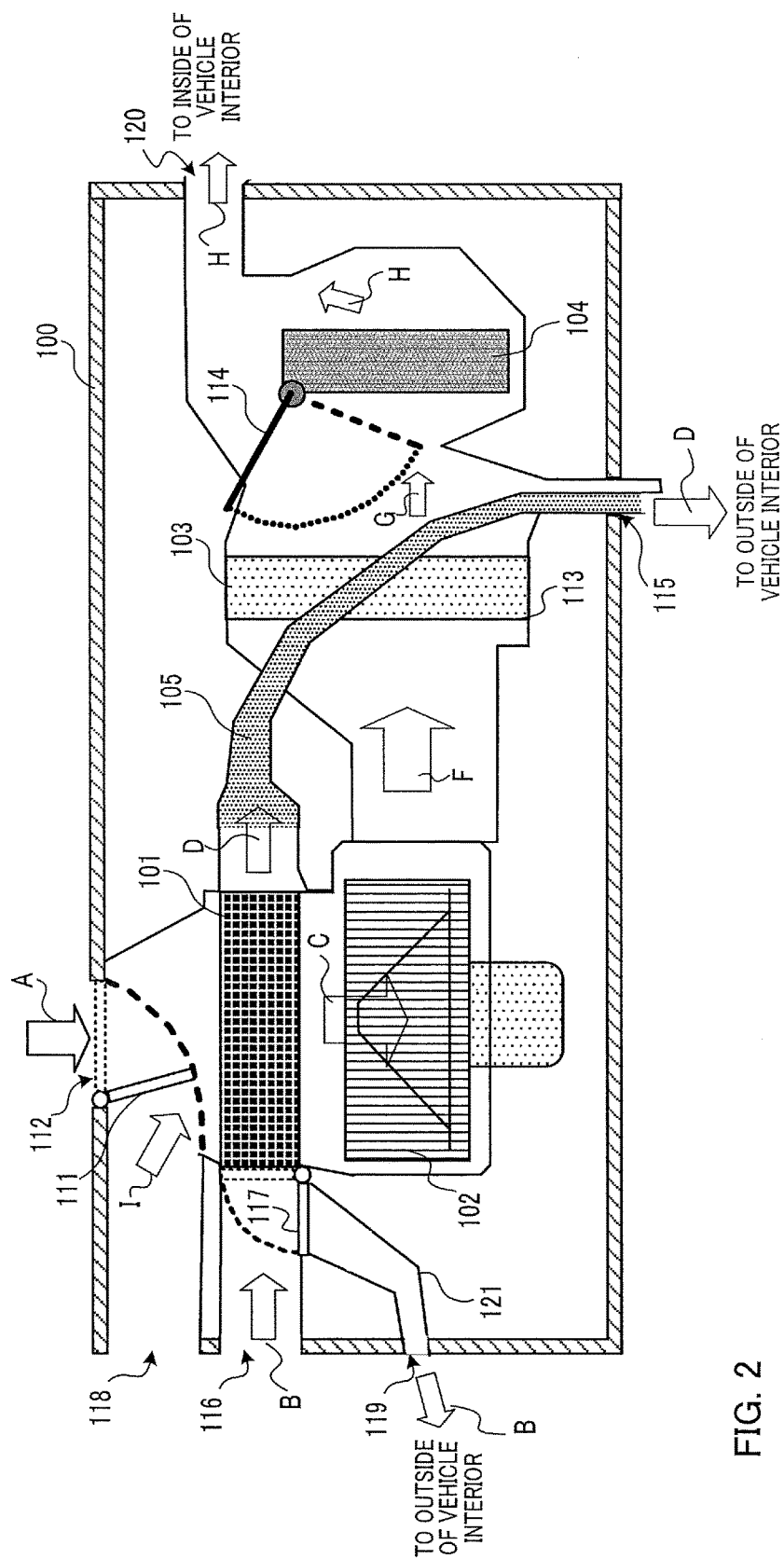
FIG. 2 is a diagram illustrating a configuration of an air conditioning unit according to an embodiment of the present invention.

FIG. 2 is a diagram illustrating a configuration of air conditioning unit 100 provided in the in-vehicle air conditioning apparatus according to the present embodiment. As air conditioning unit 100, a heat pump type is adopted, for example.

Air conditioning unit 100 takes in outside air A from the outside of the vehicle interior through outside air intake 112, and takes in inside air I from the inside of the vehicle interior through inside air intake 118. Inside air I is air that is taken in from a channel different from inside air B to be described later.

Here, air conditioning unit 100 operates intake door 111 so as to draw a trajectory of a dashed line illustrated in FIG. 2, thereby adjusting the opening degree of intake door 111. Thus, it is possible to adjust the degree of mixing between outside air A and inside air I. For example, when increasing an amount of air H (air volume) that is sent out to the vehicle interior, in order to take in only outside air A, air conditioning unit 100 operates intake door 111 to close the airflow passage of inside air I. However, when taking in only outside air A, even if the air volume can be secured, there is a risk of a drop in temperature of air H sent out to the vehicle interior. Therefore, as illustrated in FIG. 1, it is desirable to operate intake door 111 so as to take in both outside air A and inside air I. In this case, it is desirable that air conditioning unit 100 operate intake door 111 so that the degree of mixing between outside air A and inside air I becomes, a ratio of outside air A:inside air I=7:3, for example.

As illustrated in FIG. 2, outside air A and inside air I taken into air conditioning unit 100 are mixed with each other and sent to sensible heat exchanger 101. Hereinafter, the air obtained by mixing outside air A and inside air I is referred to as a "mixture." Furthermore, the airflow passage through which the gaseous mixture flows into sensible heat exchanger 101 is referred to as a "first airflow passage." In addition, the mixture is described as an example here, but in some cases, air flowing through the first airflow passage is not only the mixture but also only outside air A or only inside air I.

In addition, air conditioning unit 100 takes in inside air B from the vehicle interior through inside air intake 116. Inside air intake 116 is connected to the end of downstream side 10b of airflow passage 10 illustrated in FIG. 1. Thus, inside air B is air H that is taken into airflow passage 10 from the rear of the vehicle interior and heated by heat exchange with battery 11.

Here, air conditioning unit 100 can control a direction of guiding inside air B, by operating cooling and heating switching door 117 to draw a trajectory of a dashed line illustrated in FIG. 2. The direction of guiding inside air B is switched according to the function executed by air conditioning unit 100.

That is, when air conditioning unit 100 performs the heating function, as illustrated in FIG. 2, cooling and heating switching door 117 is controlled to close the opening of exhaust hose 121. Thus, inside air B taken in from inside air intake 116 is guided to sensible heat exchanger 101. Note that, an airflow passage through which inside air B flows to sensible heat exchanger 101 is referred to as a "second airflow passage."

Meanwhile, when air conditioning unit 100 executes the cooling function, as indicated by the dashed line in FIG. 2, cooling and heating switching door 117 is controlled to open the opening of exhaust hose 121 and close the inlet to sensible heat exchanger 101. Thus, inside air B taken in from inside air intake 116 is guided to exhaust hose 121. Inside air B is discharged to the outside of the vehicle interior from opening 119 via exhaust hose 121. In this way, in the present embodiment, since it is possible to discharge inside air B heated by battery 11 to the outside of the vehicle interior when executing the cooling function, it is possible to reduce the cooling load.

Sensible heat exchanger 101 performs heat exchange between the mixture taken in from the first airflow passage and inside air B taken in from the second airflow passage. By the heat exchange, the mixture takes heat from inside air B. Sensible heat exchanger 101 supplies blower fan 102 with air C as the mixture that has taken heat from inside air B. In addition, sensible heat exchanger 101 discharges air D as inside air B from which heat is taken by the mixture to the outside of the vehicle interior via exhaust hose 105 (an example of an exhaust passage). Note that the details of sensible heat exchanger 101 will be described later with reference to FIG. 3.

One side of exhaust hose 105 is connected to the exhaust port of inside air B in sensible heat exchanger 101, and the other side thereof protrudes to the outside of the vehicle interior from opening 115 provided in air conditioning unit 100. Thus, exhaust hose 105 discharges air D subjected to heat exchange by sensible heat exchanger 101 to the outside of the vehicle interior.

Blower fan 102 takes in air C after being subjected to heat exchange in sensible heat exchanger 101 into air conditioning duct 113.

When air conditioning unit 100 executes the cooling function, evaporator 103 cools air F by performing heat exchange between air F taken into air conditioning duct 113 by blower fan 102 and refrigerant. Moreover, air F cooled by evaporator 103 is supplied to capacitor 104 as air G. Meanwhile, when air conditioning unit 100 executes the heating function, evaporator 103 stops the flow of refrigerant. Therefore, in this case, evaporator 103 supplies air F as air G to capacitor 104, without performing heat exchange between air F taken into air conditioning duct 113 by blower fan 102 and the refrigerant.

Capacitor 104 raises the temperature of air G by performing heat exchange between air G passed through evaporator 103 and the refrigerant. Furthermore, air G heated by capacitor 104 is sent out to the vehicle interior from opening 120 as air H. Air H sent out to the vehicle interior from capacitor 104 is taken into the opening of airflow passage 10 disposed at the rear of the vehicle interior. In addition, mix door 114 is provided in capacitor 104, and by adjusting the opening degree of mix door 114, a part of air cooled by evaporator 103 is introduced into the vehicle interior without passing through capacitor 104.

As described above, air conditioning unit 100 according to the present embodiment sends temperature-controlled air into the vehicle interior and is provided with sensible heat exchanger 101 and exhaust hose 105. Sensible heat exchanger 101 performs heat exchange between air (inside air B) taken in from the vehicle interior and heated by exhaust heat of battery 11, and at least one air of outside air A introduced from the outside of the vehicle interior and inside air I introduced from the inside of the vehicle interior. Furthermore, exhaust hose 105 discharges air D, which has been heated by exhaust heat of battery 11 and subjected to heat exchange in sensible heat exchanger 101, to the outside of the vehicle interior.

The air conditioning unit provided in the in-vehicle air conditioning apparatus according to the present embodiment has been described thus far.

Next, the sensible heat exchanger provided in the air conditioning unit of the in-vehicle air conditioning apparatus according to the present embodiment will be described.

Figure 3:
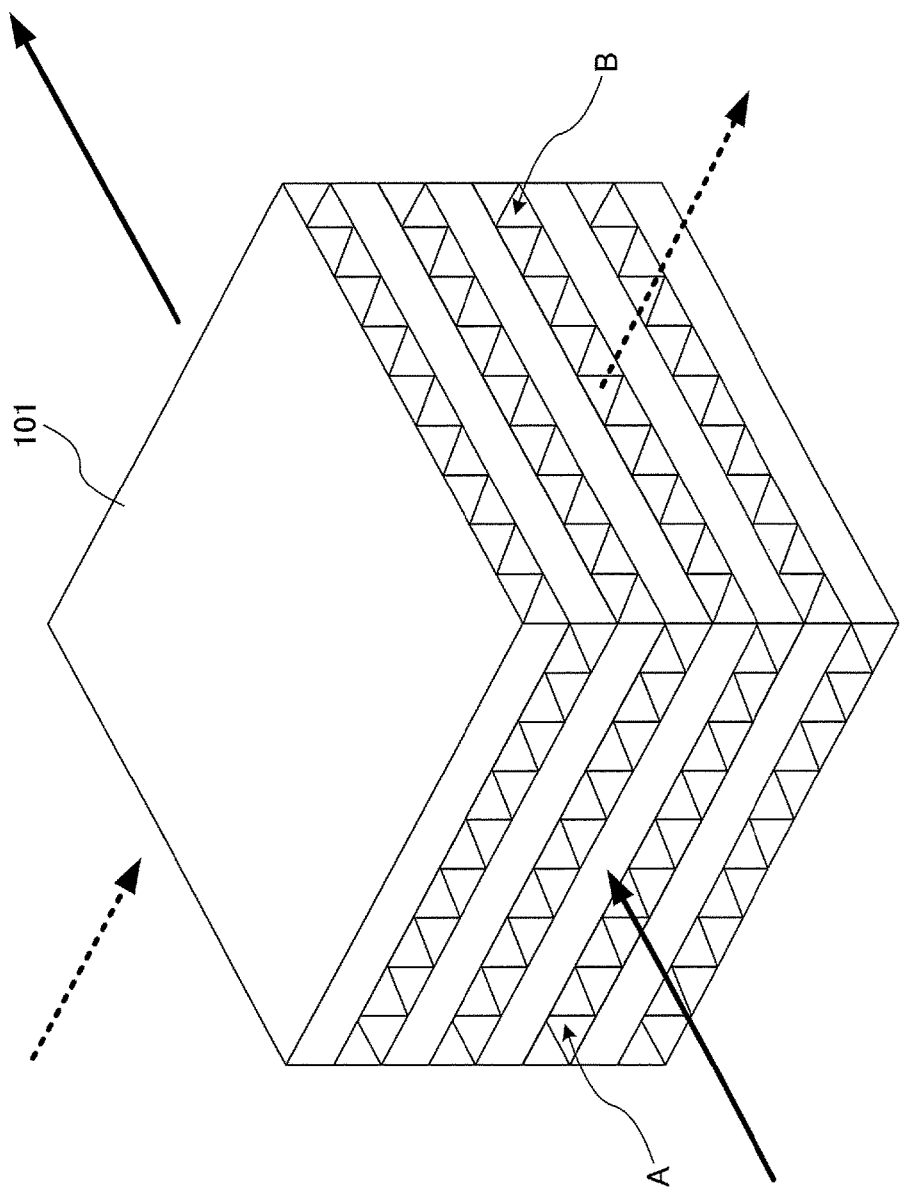
FIG. 3 is a diagram illustrating a configuration of a sensible heat exchanger according to an embodiment of the present invention.

FIG. 3 is a perspective view illustrating sensible heat exchanger 101.

As illustrated in FIG. 3, sensible heat exchanger 101 is a stationary heat exchanger having a fixed airflow passage. Sensible heat exchanger 101 has airflow passages A and B of two systems adjacent to each other, high-temperature air (for example, the above-described inside air B) flows through one airflow passage A (corresponding to the above-described second airflow passage), and low-temperature air (for example, the above-described mixture) flows through the other airflow passage B (corresponding to the above-described first airflow passage). Thus, in sensible heat exchanger 101, it is possible to move the heat of air of airflow passage A to the air of airflow passage B, without mixing the air of airflow passage A and airflow passage B. A large number of fine airflow passages are provided in airflow passages A and B of each system, and a contact area between airflow passages A and B of the two systems is made larger by disposing the fine airflow passages of each system to intersect with each other.

In the present embodiment, the reason for using the sensible heat exchanger rather than a total heat exchanger is as follows. The total heat exchanger exchanges latent heat (water vapor) as well as quantity of heat. Thus, when using the total heat exchanger, if a gas is generated from the battery by any chance, the gas is also exchanged and supplied to the vehicle interior.

The sensible heat exchanger provided in the air conditioning unit of the in-vehicle air conditioning apparatus according to the present embodiment has been described thus far.

Thus, the in-vehicle air conditioning apparatus according to the present embodiment includes the air conditioning unit that sends the temperature-controlled air into the vehicle interior, and the airflow passage that is connected to the air conditioning unit at one end, that has an opening into the vehicle interior at the other end, and that is used for sending air taken in from the vehicle interior into the air conditioning unit after the air is heated by exhaust heat from the battery, in which the air conditioning unit includes a sensible heat exchanger that discharges air sent from the airflow passage to the outside of the vehicle interior, after subjecting the air sent from the airflow passage to heat exchange with the air taken in from a different channel. That is, the in-vehicle air conditioning apparatus according to the present embodiment can prevent a gas from flowing to the vehicle interior even if a gas is generated due to a problem with the battery by any chance, while improving the heating capability of the air conditioning, by discharging the air heated by heat exchange with the battery to the outside of the vehicle interior after passing through the sensible heat exchanger.

The embodiment of the present invention has been described above, but the above description is only an example, and the present invention can be modified in various ways without departing from the gist thereof.

The disclosure of the specification, drawings, and abstract in Japanese Patent Application No. 2012-068963 filed on Mar. 26, 2012 is incorporated herein by reference in its entirety.

INDUSTRIAL APPLICABILITY

An in-vehicle air conditioning apparatus according to the present invention is suitable for use in a vehicle such as an electric automobile.

REFERENCE SIGNS LIST

1 Vehicle
10 Airflow passage
10a Upstream side of airflow passage
10b Downstream side of airflow passage
11 Battery
12 Fan 100 Air conditioning unit
101 Sensible heat exchanger
102 Blower fan
103 Evaporator
104 Capacitor
105, 121 Exhaust hose
111 Intake door
112 Outside air intake
113 Air conditioning duct
114 Mix door
115, 119, 120 Opening
116, 118 Inside air intake
117 Cooling and heating switching door

The invention claimed is:

1. An in-vehicle air conditioning apparatus mounted in a vehicle having a battery, the in-vehicle air conditioning apparatus comprising:
an air conditioning unit that sends temperature-controlled air into a vehicle interior; and
an airflow passage that is connected to the air conditioning unit at one end, that has an opening into the vehicle interior at another end, and that sends air taken in from the vehicle interior into the air conditioning unit after the air is heated by exhaust heat of the battery, wherein:
the air conditioning unit includes a sensible heat exchanger that discharges the air sent from the airflow passage to the outside of the vehicle interior after subjecting the air to heat exchange with air taken in from a channel different from the airflow passage;
the air conditioning unit sends the air taken in from the different channel and being subjected to heat exchange in the sensible heat exchanger into the vehicle interior;
the opening of the airflow passage in communication with the vehicle interior is referred to as a first opening;
the air conditioning unit includes: an air inlet that takes in air from the channel different from the airflow passage; a second opening into the vehicle interior; and an opening into the outside of the vehicle interior, and the air conditioning unit is configured to send, to the vehicle interior through the second opening, the air taken in from the different channel and subjected to heat exchange in the sensible heat exchanger;
the sensible heat exchanger is configured to perform heat exchange between the air sent from the airflow passage and the air taken in through the air inlet and to discharge the air sent from the airflow passage to the outside of the vehicle interior through the opening into the outside of the vehicle interior;
the first opening, the battery, the sensible heat exchanger, and the opening into the outside of the vehicle interior are disposed in this order from an upstream side to a downstream side in a first channel that includes the airflow passage and that is used for causing air to flow from the vehicle interior to the outside of the vehicle interior;
the air inlet, the sensible heat exchanger, and the second opening are disposed in this order from an upstream side to a downstream side in a second channel that includes the different channel and that is used for sending air into the vehicle interior;
the first channel and the second channel are mutually independent channels in which no air in either one of the channels mixes with air in the other one of the channels throughout the channels; and
the air conditioning unit includes, as the air inlet:
an outside air intake that introduces outside air from the outside of the vehicle interior; and
an inside air intake that introduces inside air taken in from the channel different from the airflow passage, and the different channel is connected to the outside air intake and the inside air intake and is used for selectively switching between the taken outside air and the taken inside air or for mixing the taken outside air and the taken inside air together, and for sending the selected air or the mixed air to the sensible heat exchanger.

2. The in-vehicle air conditioning apparatus according to claim 1, wherein the air conditioning unit is configured to guide the air sent from the airflow passage only in a direction leading to the outside of the vehicle interior via the sensible heat exchanger.

3. The in-vehicle air conditioning apparatus according to claim 1, wherein the air conditioning unit includes a switchable door that allows for switching of a direction of the air sent from the airflow passage between a direction leading to the sensible heat exchanger and a direction leading to the outside of the vehicle interior.

4. The in-vehicle air conditioning apparatus according to claim 3, wherein the air conditioning unit is configured not to guide the air sent from the airflow passage in any direction other than (i) the direction leading to the outside of the vehicle interior via the sensible heat exchanger and (ii) the direction leading to the outside of the vehicle interior via the switchable door.

5. The in-vehicle air conditioning apparatus according to claim 1, wherein the airflow passage includes a fan that is used for sending the air taken in from the vehicle interior to the air conditioning unit.

6. An air conditioning unit that is used in an in-vehicle air conditioning apparatus mounted in a vehicle having a battery and that sends temperature-controlled air into a vehicle interior, the air conditioning unit comprising:
a sensible heat exchanger that performs heat exchange between air taken in from the vehicle interior and heated by exhaust heat of the battery, and at least one of outside air introduced from the outside of the vehicle interior and inside air introduced from the inside of the vehicle interior; and
an exhaust passage that discharges the air heated by exhaust heat of the battery and subjected to heat exchange in the sensible heat exchanger to the outside of the vehicle interior, wherein
the air subjected to heat exchange with the air heated by exhaust heat of the battery in the sensible heat exchanger is sent into the vehicle interior.

* * * * *